CARD PROCESSING APPARATUS

Filed March 14, 1960 4 Sheets-Sheet 1

INVENTOR
Arthur W. Evansen
By Smyth & Roston
Attorneys.

INVENTOR:
Arthur W. Evansen
By Smyth & Roston
Attorneys.

CARD PROCESSING APPARATUS

Filed March 14, 1960

4 Sheets-Sheet 3

INVENTOR:
Arthur W. Evansen
By Smyth & Roston
Attorneys.

Aug. 14, 1962 A. W. EVANSEN 3,049,346

CARD PROCESSING APPARATUS

Filed March 14, 1960 4 Sheets-Sheet 4

INVENTOR:
Arthur W. Evansen
By Smyth & Roston
Attorneys.

United States Patent Office 3,049,346

Patented Aug. 14, 1962

3,049,346

CARD PROCESSING APPARATUS

Arthur W. Evansen, Los Angeles, Calif., assignor to The Magnavox Company, Los Angeles, Calif., a corporation of Delaware Filed Mar. 14, 1960, Ser. No. 14,863
12 Claims. (Cl. 271—4)

The present invention relates to information storage card processing apparatus, and it relates more particularly to an improved control system for use in conjunction with one or more feeding-stacking stations included in such apparatus.

The feeding-stacking station with which the present invention is concerned may be of the magazine type, for example, in which a plurality of information storage cards are stacked in a removable magazine. Such an arrangement permits a group of cards to be conveniently inserted in the feeding-stacking station for processing, and it also permits the group of cards to be conveniently removed from the station at the termination of such processing.

The term "information storage card" is intended to be used in a generic sense in the present specification and claims. The term is intended to cover any discrete element on which the information may be appropriately recorded for subsequent reproduction. Such discrete elements may include, for example, plates, boards, panels and the like.

In one type of data processing system, information is stored in digital form on a plurality of separate cards. Each of the cards is provided with a number of positions, each of which is capable of storing a different multi-digit binary number. The information may be stored in the form of discrete magnetic areas which are magnetized in one manner or another to represent either binary "1" or binary "0." However, the information may be stored on the cards in other forms. These other forms may include, for example, patterns of holes, photographic representations, etc. Appropriate transducers must be used with the different types of recordings to transform the different recordings into electrical signals.

In one type of card processing apparatus, for example, the information storage cards are maintained in a stacked relationship in a card feeding station, and the cards in the card feeding station are controllably fed in succession from the station to an appropriate transport medium. The cards are then carried by the transport medium in such apparatus past a transducer station at which the information on the cards is read and transformed into electrical signals, or at which new information is recorded on the cards from input electrical signals.

To provide flexibility in the card processing apparatus of the type under discussion, it is preferable that the card feeding stations be of the reversible type. That is, each of the card feeding stations should also be capable of stacking operations. Such reversible feeding-stacking stations are described and claimed, for example, in copending application Serial No. 538,111 filed October 3, 1955 (Patent No. 2,842,362 which issued on July 8, 1959), in the name of Robert M. Hayes; and in copending application 645,639 filed March 12, 1957 (Patent No. 2,969,979 which issued on January 31, 1961), in the name of Alfred M. Nelson et al.

Copending application 685,539 filed September 23, 1957 (Patent No. 2,901,247 which issued on August 25, 1959), in the name of Allen Orner discloses and claims an improved card processing apparatus in which the different groups of information storage cards are held in individual magazines, with each magazine holding its group of cards in a stacked relationship. The improved card processing apparatus of the above copending application 685,539 is so constructed that a selected magazine of cards may be quickly snapped into place in a feeding-stacking station and in a position to permit the cards in the magazine immediately to be fed in succession to the transport medium of the card processing apparatus. Copending application Serial No. 767,132, filed October 14, 1958, in the name of Alfred M. Nelson et al. also is directed to card processing apparatus in which removable magazines may be inserted or withdrawn from the feeding-stacking station.

The present invention, as mentioned above, is directed to a control system which may be used in the magazine type of feeding-stacking station such as those described and claimed in the copending cases referred to above. It is more important when cards are loaded into the feeding-stacking stations that the cards so loaded do not exceed the capacity of the magazine in the individual stations. This situation could occur in certain collating operations, for example, where the cards of several feeding stations are merged into a single receiving station on the basis of certain identifying information recorded on the different cards.

The improved control system of the present invention responds in one of its aspects to the loading of cards into the different receiving-stacking stations to detect an overflow condition in any one or more of the stations. The control system, in response to such a detected overflow condition, initiates appropriate alarm and corrective controls. In the system to be described, for example, the detection of an overflow condition in any one or more of the receiving stations may cause an over-riding vacuum pressure to be introduced to the active feed heads of all the feeding stations so that no further cards may be fed into the card processing apparatus. The detection of the overflow condition may also cause the transport medium in the apparatus to be de-energized and stopped from further operation. Such a detection of the overflow condition in any station of the system of the invention can also be used to initiate appropriate indications and alarms. It can also be used (as will be described) as an inter-lock criterion which must be met before the particular station can be set to its feeding mode.

The above and other features of the invention are set forth with particularity in the claims. The invention itself, however, together with further objects and advantages of the invention, can best be understood by reference to the description when taken in conjunction with the accompanying drawings, in which:

Figure 3:
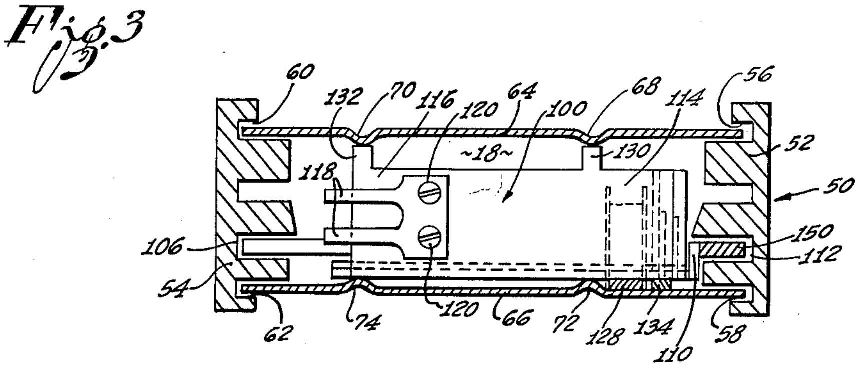
FIGURE 3 is a sectional view substantially on the line 3—3 of FIGURE 1, the latter sectional view also showing details of the magazine in the particular station and also showing a spring biased card follower which is positioned in the magazine for movement towards and away from the mouth of the magazine.
Figure 4:
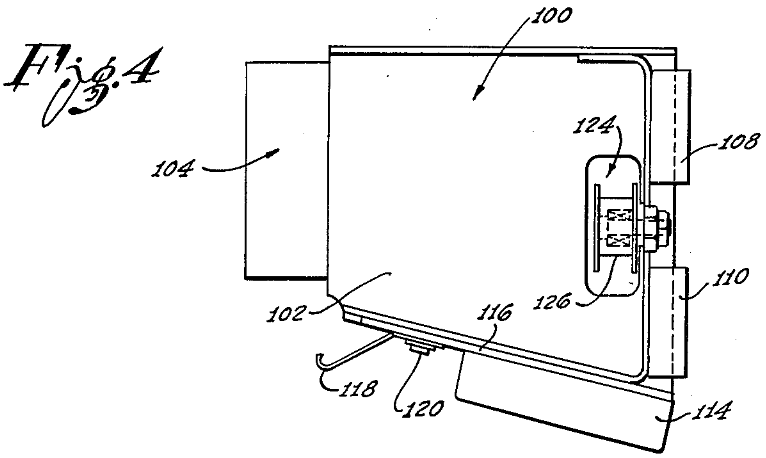
FIGURE 4 is a top view of the card follower of FIGURE 3 which is positioned in the magazine, this latter view illustrating various components of the card follower and guide members which engage slots in the wall of the magazine of FIGURES 2 and 3 to permit the card follower to move back and forth in the magazine.
Figures 7, 8:
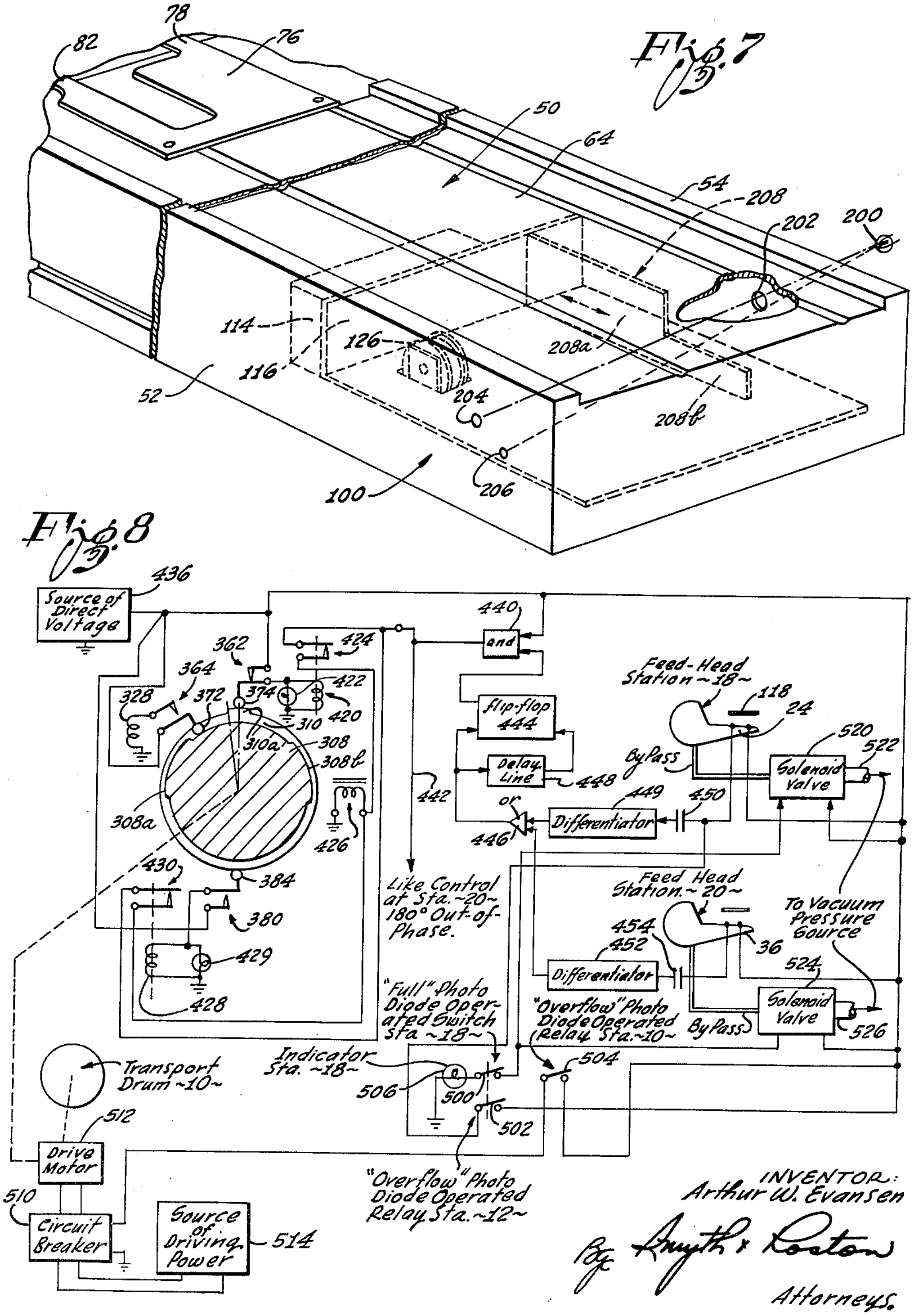

FIGURE 7 is a fragmentary perspective view illustrating the manner in which the card follower of FIGURES 3 and 4 supports a control member which functions in the control system of the invention for reasons to be explained; and FIGURE 8 is a schematic representation of various components of a suitable control system incorporating the concepts of the present invention, and further illustrating the manner in which various components of one of the reversible feeding-stacking stations referred to above control and are controlled by the components of the control system to accomplish the purposes of the invention.

Figure 1:
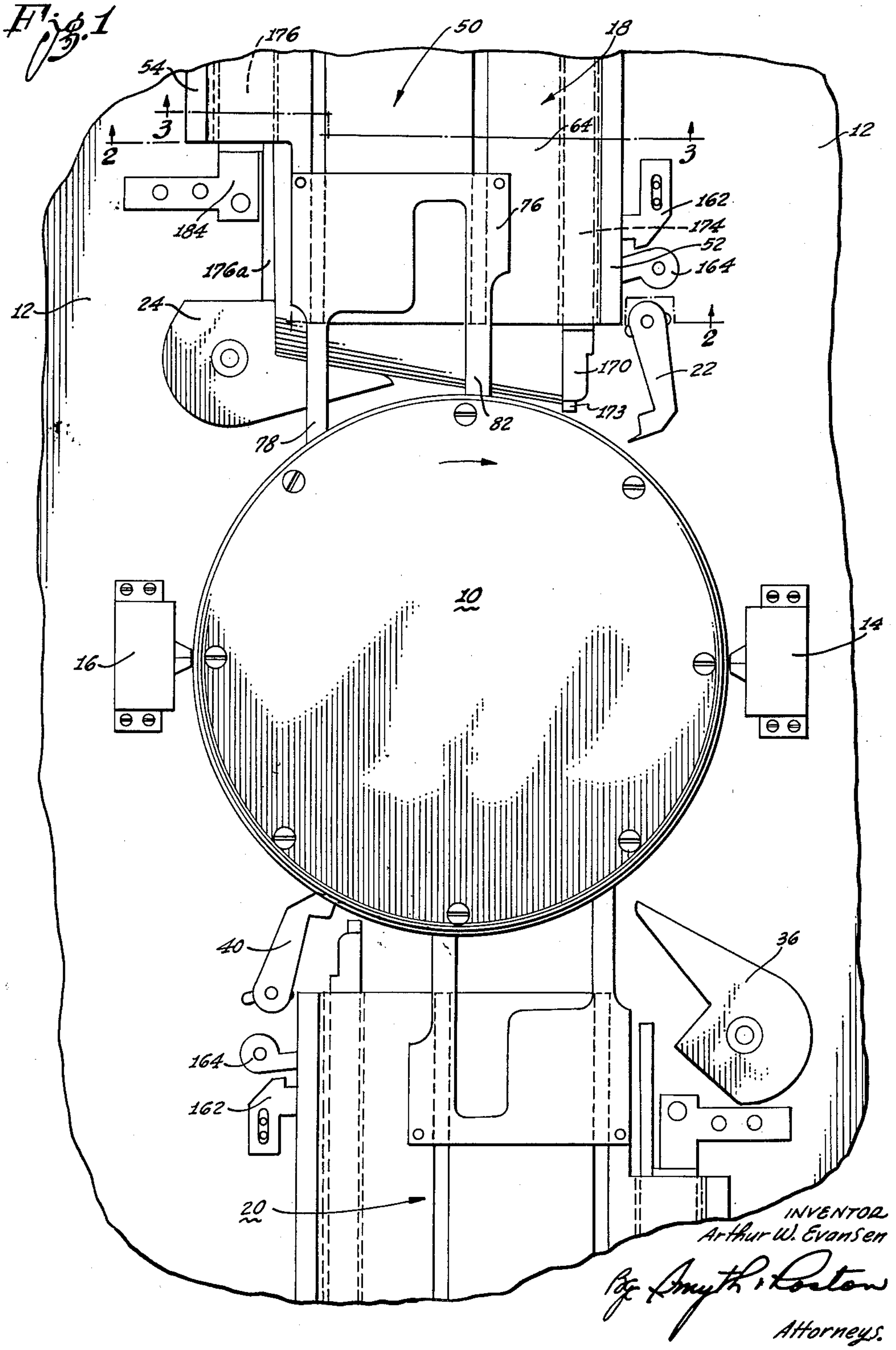
FIGURE 1 is a top plan view of a simplified form of card processing apparatus which may incorporate the concepts of the present invention, the illustrated apparatus including a pair of feeding-stacking stations which are positioned adjacent a transport medium such as a vacuum pressure rotatable transport drum.

The processing apparatus and system of FIGURE 1 is illustrated as including a transport medium such as a rotatable vacuum pressure transport drum 10. This drum is constructed, for example, in the manner described and claimed in Patent No. 2,883,189 which issued April 21, 1959, in the name of Loren R. Wilson. The drum 10 is rotatably mounted on a table top 12 for rotation in a clockwise direction. The drum is capable of exerting a vacuum pressure at its peripheral surface, and it is by means of this vacuum pressure that the information storage cards are held at spaced angular positions on the peripheral surface of the drum for transportation from one station to another in the apparatus. Full details of a rotatable vacuum pressure transport drum, such as the drum 10, may be found in the Wilson patent referred to above.

Although rotatable vacuum pressure transport drums, such as the drum 10, are shown for transporting the cards, any other suitable transport means may be used and such transport means do not necessarily have to be movable. For example, stationary transport means such as disclosed in copending application Serial No. 730,102 filed April 22, 1958, in the name of Eric Azari et al.; and in copending application Serial No. 731,413 filed April 28, 1958 (Patent No. 2,981,411 which issued on April 25, 1961), in the name of Eric Azari may be used.

A first transducer means 14 is mounted on the table top 12, and that transducer means is positioned to be contiguous to the periphery of the vacuum pressure transport drum 10. A second transducer means 16 may also be mounted on the table top 12. This second transducer means is positioned on the opposite side of the drum 10 from the transducer means 14, and the transducer means 16 is also positioned to be contiguous to the periphery of the drum. Each of the transducer means 14 and 16 may, for example, comprise a series of electro-magnetic write or read transducer heads. Each of these heads is positioned to sense and process a different row of binary bits recorded on each of the cards transported on the periphery of the transport drum 10 past its corresponding transducer means.

The transducer means 14 and 16 are positioned so that the cards can be carried by the transport drum 10 past their active faces. Each of these transducer means functions to read data on the transported cards, or to write new data on the cards, as mentioned above. As also mentioned above, the type of transducer means corresponds to the particular type of recording by which the information is stored on the different cards.

A first reversible feeding-stacking station is indicated generally as 18, and this station is positioned on the table top 12 at one side of the drum 10 between the transducer means 14 and 16. A second reversible feeding-stacking station 20 is also positioned on the table top 12, the station 20 being positioned on the opposite side of the drum 10 from the station 18. Both the feeding-stacking stations 18 and 20 are shown in fragmentary form to conserve space. The forward end of each of these stations only is shown, as such a showing is believed to be sufficient for purposes of explaining the operation of the illustrated system.

The station 18 includes a stack head 22 and it includes a feed head 24. These heads may be constructed and controlled in a manner fully described in the copending application 645,639 referred to above. Briefly, the stack head 22 is movable from a stand-by position to the right in FIGURE 1, as illustrated, to an operative position in which its end is contiguous to the periphery of the drum 10. In its operative position, the stack head engages information storage cards transported on the peripheral surface of the drum and causes such cards to be moved from the peripheral surface of the drum and to be deposited in the station 18.

The feed head 24 is movable from a stand-by position to the left in FIGURE 1 to its illustrated operative position. When the feed head is in its operative position, it controls the transfer of cards to the peripheral surface of the drum 10. This control is made through a vacuum pressure which the feed head exerts on the cards in the station, and which may be controllably interrupted. Such a feed head and its vacuum pressure control on the cards is described in detail in the copending application 645,639 referred to above.

The copending application 645,639 also fully describes the manner in which the feed head 24 and the stack head 22 may be moved between their operative and stand-by positions. The heads may be conveniently controlled, as described in that application, by mounting them on appropriate levers, and by providing a cam control for the levers. This cam control provides for one of the heads to be moved to its operative position as the other is moved to a stand-by position, and vice versa. Such a cam control will be described briefly herein in conjunction with FIGURE 8.

The feeding-stacking station 20 may also include a feed head 36 which is movable between an operative and a stand-by position, and it may include a stack head 40 which likewise is movable between a stand-by and an operative position. The stack head 40 and the feed head 36 may be similar to the corresponding heads 22 and 24 described above in conjunction with the feeding-stacking station 18. The heads 36 and 40 may be controlled to be moved between their individual operative and stand-by positions in the same manner as described in the copending application 645,639.

Figure 2:
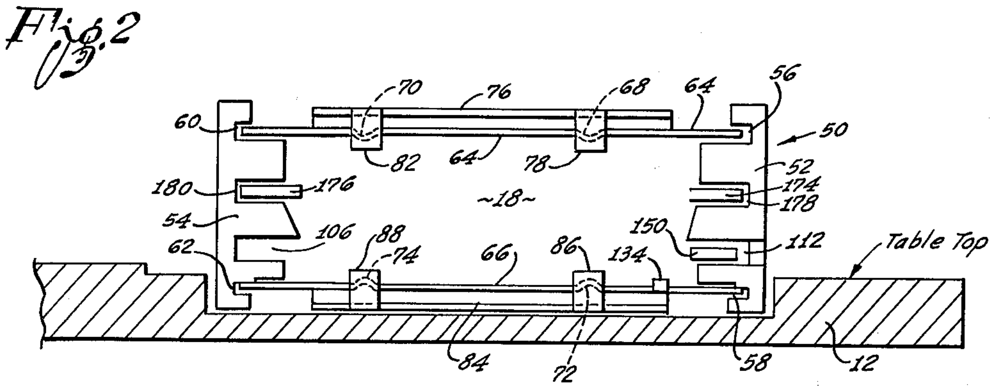
FIGURE 2 is a sectional view substantially on the line 2—2 of FIGURE 1 and showing the details of a removable magazine which is positioned in a particular feeding-stacking station in the apparatus of FIGURE 1, the sectional view illustrating various locking and retaining members which are positioned in the magazine for reasons to be explained.

As shown in FIGURE 2, the table top 12 is provided with a groove at the station 18 for receiving a magazine 50. The magazine 50, as shown in FIGURES 1, 2 and 3, may have a rectangular configuration, and it includes a pair of side walls 52 and 54. The inner surface of the side wall 52 is provided with an upper slot 56 and a lower slot 58. These slots extend lengthwise along the entire inner surface of the side wall 52. In like manner, the inner surface of the side wall 54 is provided with an upper slot 60 which extends along the entire inner surface of the side wall 54. A lower slot 62 is also formed in the inner surface of the side wall 54, and the latter slot extends along the entire inner surface of that side wall.

A top panel 64 is inserted in the slots 56 and 60, and that panel is attached to the side walls 52 and 54 by welding, or by any other appropriate means. Likewise, a lower panel 66 extends into the slots 58 and 62, and the lower panel also is attached to the side walls by welding, or by any other appropriate means. The panels 64 and 66 form the top and bottom of the magazine respectively, and these panels, together with the side walls 52 and 54, cooperate to form an open mouth at the forward end of the magazine.

A pair of ribs 68 and 70 are formed on the inner surface of the upper panel 64, and these ribs extend in parallel relationship lengthwise along the panel. A second pair of ribs 72 and 74 are formed on the inner surface of the lower panel 66, and these latter ribs extend in parallel relationship along the entire length of the lower panel. The ribs 68 and 70 are spaced and parallel to one another in the plane of the upper panel 64, and the ribs 72 and 74 are spaced and parallel to one another in the plane of the lower panel 66. The ribs 68 and 72 are axially aligned with one another, as are the ribs 70 and 74. These ribs engage the edges of the cards which are held in the magazine, and they form guides for the cards as the cards are moved back and forth in the magazine.

Figure 6:
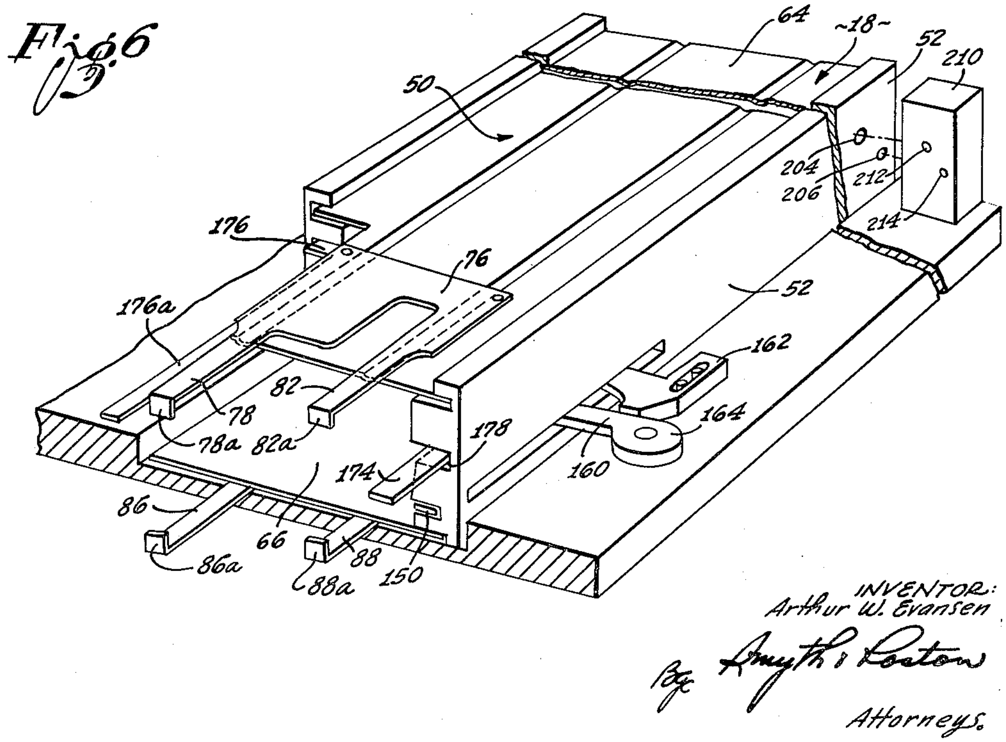
FIGURE 6 is a perspective view of the magazine of FIGURE 1, and illustrating that magazine positioned in its corresponding feeding-stacking station, and illustrating the manner in which a component of the control system of the invention may be positioned to detect the full and overload conditions of informaiton storage cards in the magazine.

An upper bracket 76, as best shown in FIGURES 1 and 6, is affixed to the top panel 64 of the magazine. The bracket 76 has a pair of finger-like elements 78 and 82 which extend outwardly from the mouth of the magazine and over the upper peripheral surface of the drum 10. These finger-like elements respectively have downwardly extending bent-over end portions 78*a* and 82*a* (FIGURE 6) which extend over the top edges of the cards transported by the drum to the mouth of the station.

A similar bracket 84 is mounted on the under side of the lower panel 66, and the latter bracket has a pair of finger-like elements 86 and 88 which extend outwardly from the mouth of the magazine and under the rim of the transpport drum 10. The finger-like elements 86 and 88 respectively have bent-over ends 86*a* and 88*a* which extend upwardly from a position under the lower edges of the cards transported to the mouth of the magazine by the transport drum 10.

The finger-like elements 78, 82, 86 and 88 extend outwardly over the cards which are disposed in the space between the mouth of the magazine and the periphery of the drum 10, as such cards are successively fed from the magazine in sequence to the periphery of the drum during a feeding mode of operation; or when such cards are fed from the periphery of the drum into the magazine during a stacking mode of operation.

Then, when it is desired to withdraw the magazine from the station, the bent-over ends 78*a*, 82*a*, 86*a* and 88*a* of the finger-like elements 78, 82, 86 and 88 engage the card on the periphery of the drum 10 to draw that card, together with the cards in the space between the mouth of the magazine and the periphery, away from the drum. The bent-over finger-like elements 78, 82, 86 and 88, and certain sliding elements (which will be described) cage the cards from the forward end of the magazine as the magazine is withdrawn from the station. These elements firmly retain the cards in the magazine so as to prevent the cards from falling out of the magazine.

A card follower 100 (FIGURES 3 and 4) is positioned in the magazine for longitudinal movement along the ribs 72 and 74 towards the mouth of the magazine and back away from the mouth. The card follower may be constructed in a manner similar to that described in copending application Serial No. 717,270, filed February 24, 1958 (Patent No. 2,947,538 which issued on August 2, 1960), in the name of Eric Azari et al. The card follower is spring-biased towards the mouth of the magazine, and its function is to maintain the cards in a stacked condition in the magazine and to bias the cards against the peripheral surface of the transport drum 10.

When the cards in the magazine 50 are sequentially fed to the periphery of the drum 10 during a feeding mode of operation, the card follower 100 is moved forwardly in the magazine in accordance with the biasing of the spring. Conversely, when the cards are stacked from the drum into the magazine during a stacking mode of operation, the card follower 100 moves rearwardly against the bias of the spring. During both modes of operation, however, the card follower is spring-urged against the rear of the stack of cards in the magazine to hold the cards in a stacked condition.

The card follower 100 includes a flat bottom panel 102 which may have a lubriating substance, such as that designated by the trade name of Teflon, secured to its lower surface and which engages the ribs 72 and 74. A first guide strip 104 is secured to one side of the bottom panel 102, and this guide strip extends into a slot 106 which is formed on the inner surface of the side wall 54. The slot 106 extends for the length of the side wall 54, and it serves as a guide for the card follower 100.

The bottom panel 102 of the card follower also has a pair of elongated members 108 and 110 secured to its opposite edge. These latter members serve as guide strips and are disposed adjacent a slot 112 which is formed in the inner surface of the side wall 52. The latter slot extends lengthwise along the entire length of the inner surface of the side wall 52.

A resilient pad 114 formed, for example, of sponge rubber, or similar substance, is secured to an upstanding bracket 116 at the front of the card follower 100. As illustrated in FIGURE 4, the bracket 116 and the member 114 are inclined when viewed in plan so that the cards may be brought into the proper position for feeding them to the periphery of the drum 10, when the station is conditioned to the feeding mode.

A pair of electric switching contacts 118 are secured to the bracket 116 by a corresponding pair of screws 120. These contacts are connected to one another, and they serve to engage a pair of normally open electric switching contacts on the face of the feed head 24 when the last card is transferred out of the station. This completes an appropriate electric circuit, and under the control of suitable logical circuitry, certain desired controls may be initiated after the station is empty. For example, when the station is empty, it is desirable to change its mode of operation from the feeding mode to the stacking mode, so that the cards in the station 20, for example, may be fed from that station to the transport drum in succession and thereby returned to the station 18. If so desired, the electric switching contacts described above may be replaced by the photoelectric control system described and claimed in copending application (M–185).

The bottom panel 102 of the card follower 100 has a slot 124 formed in it adjacent the guide strips 108 and 110. A bearing 126 is rotatably mounted on an appropriate bracket to be disposed over the slot 124. A resilient spring strip 128 (FIGURE 3) is secured to the panel 66 at its forward end, and this spring strip has a tendency to curl up on itself around the rotatable bearing 126. This action of the spring strip 128, and of the bearing 126, causes the card follower to be biased forwardly towards the mouth of the magazine, for the reasons described above.

The upstanding bracket 116 is equipped with a pair of upwardly extending portions 130 and 132 (FIGURE 3). These portions 130 and 132 engage the ribs 68 and 70 respectively. A guide rail 134 is inserted in the lower panel 66, and this guide rail extends into a slot formed at the bottom of the panel 102. Therefore, the spring biased card follower 100 is supported between the ribs 68, 72 and 70, 74. The card follower 100 is also supported by the guide bracket 104 and its guide slot 106, and by the guide rail 134 and its corresponding slot in the bottom panel 102. The card follower 100 is supported in this manner for longitudinal movement in the magazine toward and away from the mouth of the magazine. As mentioned above, the spring strip 128 serves to bias the card follower 100 towards the mouth of the magazine.

As fully described in the copending application Serial No. 823,690 (Patent No. 2,977,113 which issued on March 28, 1961, in the name of H. J. Malin et al.), an elongated locking bar 150 (FIGURES 2 and 3) is mounted in the panel 112 of the side wall 52 in a position to lie adjacent the edges of the elongated members 108 and 110. The outer edges of the members 108 and 110 may be knurled, as may the facing edge of the locking bar 150. As fully described in the copending application, the locking bar 150 is mounted in the slot 112 for limited longitudinal movement relative to the side wall 52. The arrangement is such that when the locking bar 150 is moved forwardly in the slot 112, it moves laterally away from the members 108 and 110 to a dis-engaged position. However, when the locking bar 150 is moved back along the slot 112, it is moved laterally inwardly so that its inner edge engages the facing edges of the members 108 and 110. This latter movement of the locking bar is into an engaged position with respect to the card follower 100. When the locking bar 150 is in such an engaged position, it firmly retains the card follower 100 in whatever position the card follower was established by the stack of cards in the magazine when the locking bar 150 moves to its engaged position.

Figure 5:
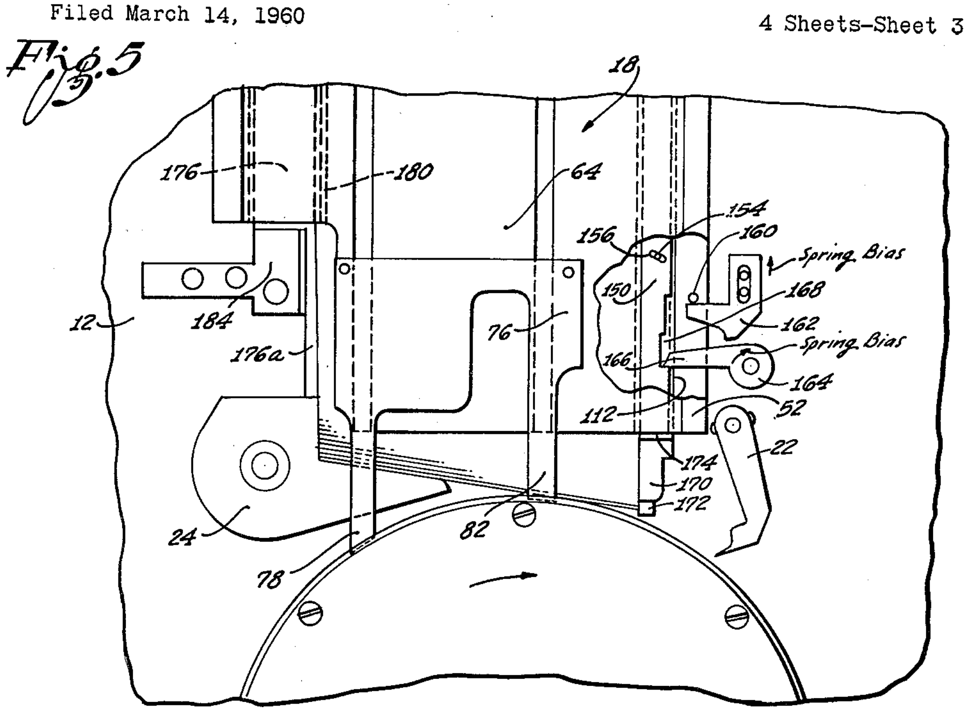
FIGURE 5 is a fragmentary top plan view illustrating the manner in which a pair of actuators co-operate with one another and with a locking bar in the magazine to cause the locking bar to be moved between engaged and disengaged positions with respect to the card follower of FIGURES 3 and 4.

As more clearly shown in FIGURE 5, the locking bar 150 is retained in the panel 112 by means of a plurality of upstanding studs, such as the stud 154. These studs extend through inclined slots, such as the slot 156, which are formed in the locking bar. A suitable resilient spring, which will be described in conjunction with FIGURE 6, serves to normally bias the locking bar toward the rear of the magazine. Such biasing action causes the studs 154 to engage the sides of the slots 156, so that the locking bar 150 is moved against the members 108 and 110 of FIGURE 4 to engage those members and thereby to lock the card follower 100.

As shown in FIGURE 5, for example, a projection 160 is formed on the side wall 52 of the magazine 50, and a pawl 162 is mounted in the station 18. The pawl has a portion extending through a slot in the magazine to be engaged by the projection 160 as the magazine is moved into place in the station 18. The pawl 162 is mounted for limited reciprocal movement in the station 18, and it is spring biased by any appropriate biasing means (not shown) in a direction towards the rear of the magazine. A further actuating pawl 164 is rotatably mounted in the station 18, and this latter pawl is spring biased by any appropriate biasing means (not shown) in a clockwise direction. The pawl 162 engages the further pawl 164, so that when the pawl 162 is moved by the projection 160, it moves against the further pawl 164 and rotates the further pawl in a counter-clockwise direction against its spring biased pressure. The further pawl 164 has an actuating arm 166 which extends through a slot in the magazine and into engagement with a shoulder 168 formed in the side of the locking bar 150.

The result is that when the magazine is moved into place in the station 18, the projection 160 moves against the pawl 162 and causes that pawl to move against the pawl 164. The pawl 164 is thereby rotated in a direction such that its actuating arm 166 causes the locking bar 150 to be moved forward towards the mouth of the magazine. This action serves to disengage the locking bar from the card follower 100. Conversely, when the magazine is moved back out of the station 18, the locking bar 150 becomes disengaged from the arm 166 of the pawl 164, and it is spring biased back into locked engagement with the card follower 100.

The mechanism described above is fully described and claimed in the copending application Serial No. 823,690. The mechanism provides that whenever the magazine 50 is placed in the station 18, its card follower 100 is freed and spring biased towards the mouth of the magazine. This permits the card follower to perform its intended function of maintaining the cards in the magazine in a stacked condition against the peripheral surface of the transport drum. However, whenever the magazine is moved from the station, and regardless of the number of cards in the magazine, the card follower immediately becomes locked against the stack of cards in the magazine to firmly retain the cards in the magazine, and to prevent the cards from falling out of the magazine when the magazine is in its file block, or as the magazine is moved to and from the file block.

As shown in FIGURES 1 and 5, for example, a stop member 170 is positioned in the station 18 adjacent the leading edge of the wall 52 of the magazine when the magazine is moved into position in the station 18. The stop member 170 has an extremity 172 which is precisely positioned adjacent the periphery of the drum 10. The extremity 172 defines a feed throat with the drum 10, and it permits one card at a time only to pass from the station onto the periphery of the drum.

The station 18 is illustrated in FIGURE 1 as being in its feeding mode of operation. For that mode of operation, the stack head 22 is withdrawn to a stand-by position and the feed head 24 is moved to an operative position. A vacuum pressure is established at the face of the feed head 24, and that face engages the leading card in the station 18. The vacuum pressure exerted at the periphery of the drum 10 also acts on the leading card, but the vacuum pressure from the feed head is made greater so that the feed head holds the card in the station 18. However, whenever the vacuum pressure at the face of the feed head 24 is interrupted, the cards pass in a one-by-one sequence through the feed throat formed by the extremity 172 of the stop member 170.

As best shown in FIGURES 2 and 6, a pair of elongated slide members 174 and 176 are positioned in slots 178 and 180 formed in the inner surface of the side walls 52 and 54 respectively. These slide members 174 and 176 are positioned adjacent the mouth of the magazine, and they are spring biased in a manner to be described, so that they normally extend beyond the extension of the side walls 52 and 54 to the position illustrated in FIGURE 6. When the slide members 174 and 176 are in their extended positions, their extremities extend into the plane of the ends of the finger-like elements 78, 82, 86 and 88.

The slide members 174 and 176 serve to cage the leading cards in the magazine when the magazine is withdrawn from the station 18. These cards are retained in a stacked condition in the magazine between the bent-over extremity of the finger-like elements 78, 82, 86 and 88 and the locked card follower 100. At the same time, lengthwise movement of the cards is prevented by the slide members 174 and 176 in their extended position. The constructional details of the slide members 174 and 176, and the manner in which they are mounted in the magazine 18, is fully described and claimed in copending application Serial No. 829,430.

When the magazine 50 is moved into position in the station 18, a stop member 184, which is mounted in the station 18 adjacent the feed head 24, engages a shoulder on the slide member 176 and retains the slide member in fixed position while the magazine is being moved forwardly toward the drum 10. This in effect forces that slide member to a retracted position back into the slot 180 against the pressure of its biasing spring.

However, when the slide member 176 is in its retracted position, a portion 176*a* of the slide member extends out from the mouth of the magazine, as shown in FIGURE 1, into a position closely adjacent the feed head 24. This protruding portion 176*a* of the slide member 175 has a cammed inner surface which is inclined slightly inwardly and which serves to shift the cards in the station laterally to the right in FIGURE 5, for example, and into an appropriate feeding position with respect to the feed head after the magazine is in place. The end of the slide member 174, on the other hand, engages the stop member 170, and the latter slide member is forced entirely back into its slot 178 to a retracted position when the magazine is moved into place.

A light source 200 (FIGURE 7) is mounted adjacent the station 18 in a position to direct light into the magazine 50 when the magazine is in position in the station. The light source 200 is illustrated in schematic form only in FIGURE 7. It is to be understood that this light source may have an appropriate form, and it may be mounted in position by any appropriate mounting means. The light from the light source 200 passes through an aperture 202 in the side wall 54 of the magazine and extends across the magazine in a pair of light beams which emerge from a first aperture 204 in the side wall 52 and from a second aperture 206 in that side wall. The apertures 202, 204 and 206 are positioned near the rear of the magazine, as illustrated in FIGURE 7.

The spring biased card follower 100 has a light barrier 208 mounted on it. The barrier 208 is supported on the bottom member of the card follower and extends back from the bracket 116 in a longitudinal direction. The barrier 208 has a cut-away portion adjacent its trailing edge, so that it has a forward portion 208*a* having a particular height, and it has a rear portion 208*b* having a height less than that of the forward portion. The apertures 202, 204 and 206 are arranged so that the rear portion 208*b* of the barrier has a sufficient height to break the light beam extending between the aperture 202 and the aperture 206 when the card follower 100 is moved back into the magazine 50 a sufficient distance. In this position, the rear portion of the barrier 208 extends across the optical axis defined by the light source 200 and the apertures 202 and 206. However, the aperture 204 is disposed above the aperture 206, so that the rear portion 208*b* of the barrier 208 does not have a sufficient height to interrupt the light beam which passes from the source 200 through the aperture 202 to the aperture 204. However, when the card follower 100 is moved back in the magazine 50 a distance sufficient so that the forward portion 208*a* of the barrier moves across the optical path from the light source 200 through the aperture 202 to the aperture 204, the latter light beam is also interrupted.

The assembly and system described in the preceding paragraphs provide that as the card follower 100 moves back into the magazine 50, the trailing portion 208*b* of the barrier 208 first interrupts the light beam from the source 200 to the aperture 206. Then, as the card follower 100 moves still further back into the magazine, the forward portion 208*a* of the barrier 208 additionally interrupts the light beam from the source 200 which passes through the aperture 202 to the aperture 204.

A photo-electric unit 210 (FIGURE 6) is positioned adjacent the station 18 on the opposite side of the magazine 50 from the light source 200. This photo-electric unit includes, for example, a first photo-electric cell 212 which is positioned so that any light emerging from the light source 200 through the aperture 204 is incident upon it. The photo-electric unit 210 also includes a second photo-electric cell 214 which is positioned so that any light emerging from the light source 200 through the aperture 206 is incident on it.

Therefore, as the card follower 100 is moved back in the magazine 50 by cards loaded successively into the magazine, the trailing portion 208*b* of the barrier 208 first interrupts the light from the aperture 206 to de-activate the second photo-electric cell 214 in the unit 210 and cause its associated relay contacts to close. Then, any further movement of the card follower 100 to the rear of the magazine 50 due to additional cards being loaded into the magazine causes the forward portion 208*a* of the barrier 208 to break the light beam from the aperture 204 so as to de-activate the first photo-electric cell 212 in the unit 210 and cause its associated relay contacts to close.

In the manner described above, when the magazine 50 is in place in the station 18, and when a similar magazine is in place in the station 20, cards may be transported from one of the stations to the other by the vacuum pressure transport drum 10. As also explained above, it is most important that when either of the stations is in a receiving-stacking mode, any possibility for such a station to receive more cards than it can handle is obviated. It is evident that any over-loading of the magazines can result not only in a time consumnig interruption in the operation of the apparatus, but can also result in damage to the equipment and to the cards.

As also explained above, whenever a station is positioned to its loading mode, and as cards are loaded into the station, the card follower 100 in the magazine moves rearwardly in the magazine against its spring-biased tension to maintain the cards in a stacked condition in the magazine. In accordance with the embodiment of the present invention under consideration, as the card follower 100 moves back into its magazine 50, it is constructed to include a light barrier means 208 which serves to break the second light beam when the magazine has reached a full condition. This de-activates the photo-cell 214 which, in the manner to be described, can be used to control the energizing of an indicator lamp. Breaking the second light beam serves also to provide an over-riding vacuum pressure to all the active feed heads in the other feeding-stacking stations in the system so that no further cards can be fed to the transport drum 10.

Then, if for any reason, additional cards are fed into the station so that the magazine reaches a dangerous over-loaded condition, the first light beam is broken and the corresponding photo-cell 212 in the unit 210 is de-activated to operate a suitable circuit brekaer so as to stop the rotation of the transport drum 10. These controls are carried out by the control system illustrated in the circuit diagram of FIGURE 8. It is to be understood that the controls mentioned above, and to be described in conjunction with FIGURE 8, are merely suggested typical controls that may be initiated by the control system of the invention as a warning and remedial measure for over-loading of the various magazines.

As mentioned above, the feeding-stacking station 18, and the feeding-stacking station 20, may each be controlled between its feeding mode and its stacking mode by a cam member which operates appropriate levers, and which levers serve to move the feed head 24 and the stack head 22 between their operative and stand-by conditions. Such a cam may be mounted on a vertical shaft, and a pair of switch actuating cams 308 and 310 may be mounted on the same shaft. These switch actuating cams cause appropriate switches to be operated as the station is conditioned between its feeding and its stacking mode.

The control system of FIGURE 8 shows schematically the switch actuating cams 308 and 310 mentioned above, and it also shows in schematic form a group of cam operated switches 362, 364 and 380 which are actuated by the cams. It will be seen from FIGURE 8 that the cam 310 has a raised portion 310*a* which actuates the cam follower 374 of the switch 362, and which also actuates the cam follower 384 of the switch 380.

The switch 362 is actuated by the cam follower 374. The switch 362 is closed by the portion 310*a* of the cam 310 for a particular portion of the angular travel of the cam 310, and the switch 362 is held closed for an angular increment of the cam 310 of, for example, 40°. The switch 380, on the other hand, is closed when the portion 310*a* of the cam 310 is displaced 180° from its position in which the cam follower 374 was actuated to close the switch 362. Therefore, for one position of the cam 310 corresponding, for example, to 0°, the switch 362 is closed; and for a second position of the cam 310 corresponding, for example, to 180°, the switch 380 is closed.

The switch actuator cam 308 has two raised portions 308*a* and 308*b*, and these are separated from one another by an angular distance of, for example, 180°; and each extends, for example, for an angular distance of 60°. The raised portions 308*a* and 308*b* of the cam 308 actuate a cam follower 372 to close the switch 364 for corresponding portions of the angular travel of the cam 308.

The armature of the switch 362 is connected to one side of the energizing winding of a relay 420. The other side of this relay winding is grounded, and the winding may be shunted by an indicator lamp 422. The relay 420 includes a normally open relay switch 424. The fixed contact of the relay switch 424 is connected to one side of the energizing winding of a solenoid 426, the other side of this winding being grounded. The solenoid 426, as fully described in the copending application Serial No. 645,639, when energized for a brief instant will allow a clutch to release and enable a drive motor to drive the cams 308 and 310 through 180°. At the same time, the drive motor causes the station to change its mode from feeding to stacking, and vice versa.

The armature of the switch 380 is connected to one side of the energizing winding of a relay 428. The other side of this winding is connected to ground, and the winding is shunted by an indicator lamp 429. The relay 428 includes a normally open relay switch 430. The fixed contact of the switch 430 is connected to the ungrounded side of the energizing winding of the solenoid 426. The armature of the relay switch 430 is connected to the armature of the switch 424. The fixed contact of the switch 380, together with the fixed contact of the switch 362 and the armature of the switch 364 are connected to the positive terminal of a source of direct voltage 436. The fixed contact of the switch 364 is connected to one side of the energizing winding of a solenoid 328. The other side of this winding is grounded. The solenoid 328 controls the vacuum pressure at the surface of the feed head 18, and that vacuum pressure is removed from that surface when the solenoid is energized.

The portion of the control system of FIGURE 8 described above may be included in the feeding-stacking station 18. A similar control system may be included in the feeding-stacking station 20, and a connection may be made to the latter control system over the lead 442. It should be noted that the switch actuator cams 308 and 310 at the station 20 must be displaced 180° with respect to the corresponding cams at the station 18. This is in order that the two stations may operate in a complementary manner, with one in a feeding mode when the other is in a stacking mode, and vice versa.

An "and" gate 440 has its output terminal connected to the armature of the switch 424. One of the input terminals of the "and" gate 440 is connected to the positive terminal of the source of direct voltage 436. The other input terminal of the "and" gate 440 is connected to the left output terminal of a flip-flop 444. The output terminal of the "and" gate 440 is connected to the armature of the switch 424, as noted, and to the lead 442 extending to the armature of a similar switch in the station 20. The output terminal of an "or" gate 446 is connected to the left (or "true") input terminal of the flip-flop 444. A delay line 448 of any suitable construction connects the output terminal of the "or" gate 446 to the right (or "false") input terminal of the flip-flop. A differentiator 449 has its output terminal connected to one input terminal of the "or" gate 446, and the differentiator has its input terminal connected to one terminal of a capacitor 450. The capacitor, in turn, is connected to one of the fixed contacts on the feed head 24 which, as described above, is short circuited with a second fixed contact on the feed head by the switching contacts 118 of FIGURE 3, when the last card has left the station. The second fixed contact on the feed head 24 is connected to the positive terminal of the source 436.

A differentiator 452 is connected to a second input terminal of the "or" gate 446. A capacitor 454 is connected between the input terminal of the differentiator 452 and one of the fixed contacts on the feed head 36 of the station 20. The other fixed contact on that feed head is connected to the positive terminal of the source 436.

In explaining the operation of the stations 18 and 20 by the portion of the control system of FIGURE 8 described above, it will be assumed that the station 18 is in its feeding mode and that the station 20 is in its stacking mode. As shown in FIGURE 8, the switch 362 is held closed for this condition, and the relay winding 420 and its indicator lamp 422 are energized. This causes the relay switch 424 to be closed so that a circuit through the switch 424 to the clutch actuating solenoid 436 is provided. During this operating condition, the switch contacts on the feed head 24 and the switch contacts on the feed head 36 are open as long as there are cards in both the stations. However, when the last card leaves the station 18, the connecting arm 118 establishes an electric connection between the contacts on the feed head 24. This connects the capacitor 450 to the positive terminal of the source 436 so that a surge of current flows into the capacitor. This produces a current pulse which is differentiated and sharpened in the differentiator 449 and applied to the left input terminal of the flip-flop 444 through the "or" network 446. It should be appreciated that the stages such as the capacitor 450 and the differentiator 449 are included only by way of illustration and that other stages may also be used.

The flip-flop 444 is triggered by the pulse from the differentiator 449 into its true state in which a relatively high voltage appears at its left output terminal. This relatively high voltage prepares the "and" network 440 for translation so that the positive voltage from the source 436 appears at the output terminal of the "and" gate. This voltage is therefore introduced through the closed relay switch 424 to the clutch-actuating solenoid 426.

The delay line 448 returns the flip-flop 444 to its false state a short time thereafter to effectively remove the voltage from the clutch-actuating solenoid winding 426. The control is such that the solenoid 426 is energized just long enough to release the clutch and cause the cams 308 and 310 to move 180° in the described manner. The cam controlling the feed head 24 and stack head 22 of the station 18, and the attached coaxial switch actuator cams 308 and 310, are not rotated through 180° in a counterclockwise direction. As the cam 310 turns, the portion 310*a* moves out of engagement with the cam follower 374 so that the switch 362 opens. This de-energizes the relay winding 420 and opens the conditioning circuit through the relay switch 424 to the energizing winding of the clutch actuating solenoid 426.

After rotation through a suitable angular distance, such as approximately 30°, the main cam begins to bring the stack head 22 of the station 18 into its operating position. After a rotation through a suitable angular distance, such as approximately 90°, the portion 308*b* of the cam 308 engages the cam follower 372 to close the switch 364. This causes the vacuum pressure at the surface of the feed head 24 to be turned off. After rotation through a suitable angular distance, such as approximately 100°, the feed head begins to move back to its stand-by position. The feed head is moved fully to its stand-by position at, for example, 150° rotation of the main actuating cam.

After a suitable angular rotation, such as approximately 160°, the portion 310*a* of the switch actuator cam 310 engages the cam follower 384. This causes the switch 380 to close and the relay winding 428, together with its indicator lamp 429, to be energized. When the relay winding 428 is energized, the relay switch 430 is closed to prepare a circuit through the switch 426 to the energizing winding of the clutch actuating solenoid 426. The system now enters a latent condition, and it remains in that condition until the solenoid 426 is again energized. The station 18 is now conditioned to function in a stacking mode.

At the same time as the controls described above are taking place in the station 18, the lead 442 may cause a similar control to be taking place at the station 20. However, the controls provided at the station 20 are inverted in time sequence with respect to the controls provided at the station 18. That is, the station 20 may be controlled to change from its stacking to its feeding condition at the same time that the station 18 is controlled to change from its feeding condition to its stacking condition. An appropriate delay may be incorporated in the lead 442 to permit the last card from the station 18 to reach the station 20 before the change-over is made. Then after the next operating cycle of the apparatus, the switch contacts on the feed head 36 are closed to re-initiate the operations described above. The latter control sequence causes the station 18 to return to its feeding condition, and causes the station 20 to return to its stacking condition.

By means of the portion of the control system of FIGURE 8 described above, the stations 18 and 20 may be automatically operated to obtain a transfer of cards from each station to the other. The change-over may occur each time that a particular feeding station becomes empty so that the particular station becomes a stacking station and the other station becomes a feeding station.

As noted above, when two or more stations are controlled to feed cards into a single station, there is a likelihood of an over-load condition occurring in the station into which the cards are being stacked. The control system of the present invention is intended to eliminate the possibility of any such condition arising.

As described above, the photo-electric unit 210 of FIGURE 6 includes a second photo-electric device upon which the light beam emerging through the aperture 206 is incident. When that light beam is interrupted by the rear portion **208*b* of the light barrier 208 on the card follower in FIGURE 7, the second relay device is deactivated and this causes a pair of relay contacts 500 and 502 in FIGURE 8 to close. As mentioned above, the barrier 208 may be constructed so that its portion 208*b* interrupts the light to the aperture 206, so as to cause the relay contacts 500 and 502 to close, when the magazine 50** has reached a full condition with respect to cards being stacked in it.

As mentioned above, the photo-electric unit 210 includes a first photo-electric device upon which the light emerging from the aperture 204 is incident. When that light beam is broken by the leading portion **208*a* of the light barrier 208, a relay switch 504 in FIGURE 8 is caused to close. As also described above, the latter condition is caused to occur when, for any reason, cards continue to be fed into the magazine 50** and a dangerously over-loaded condition is about to exist in that magazine.

The manner in which the first and second photo-electric devices are mounted in the photo-electric unit 210, and the manner in which these devices are electrically connected to suitable relays to control the operation of the relay switches 500, 502 and 504 is believed to be well understood in the art. For that reason a detailed explanation of the internal connections and construction of the photo-electric unit 210 in FIGURE 6 will not be included in the present specification. By way of illustration, the switches 500, 502 and 504 may actually constitute photo-electric cells such as the cells 212 and 214 in FIGURE 6 and may further constitute inverters in association with the cells. Since the impedance provided by the cells changes from a high value to a low value when the cells become energized, the inverters provide a low impedance corresponding to a closed switch when the optical path to the associated photo-electric cells become interrupted.

The armature of the relay switch 500 is connected through an appropriate alarm or indicator lamp 506 to ground. The other contact of the relay switch 500 is connected through solenoid valves 520 and 524 to the positive terminal of the source 436 of direct voltage. The armature of the relay switch 502 is connected to the capacitor 450, and the fixed contact of the latter relay switch is also connected to the positive terminal of the source 436.

The fixed contact of the relay switch 504 is connected to the positive terminal of the source 436, and the armature of that switch is connected to one terminal of a circuit breaker 510. The circuit breaker 510 may have a conventional construction, and it is interposed in the energizing circuit of a drive motor 512, and between the driving motor and a source 514 of driving power. The driving motor 512 is mechanically coupled to the transport drum 10 of FIGURE 1, and it produces the desired rotational movement to the transport drum. The circuit breaker 510 is constructed in known manner so that when the relay switch 504 is closed, the circuit breaker is actuated to open the energizing circuit to the drive motor 512. This causes the drive motor 512 immediately to be braked to a halt.

Similar circuitry and controls to those described in the preceding paragraphs may be incorporated in the control system associated with the station 20.

When the station 18 is in its stacking mode, and when cards are being fed into that station, the card follower 100 moves back in the magazine 50 and holds the cards against its spring biasing pressure to maintain the cards in the magazine 50 in a stacked condition. When the magazine starts to become full, the rear portion **208*b* of the light barrier 208 breaks the beam of light emerging from the aperture 206 in the magazine. This causes the contacts 500 and 502 in FIGURE 8 to close. When the relay contacts 502 close, the capacitor 450 is connected to the positive terminal of the source 436. This, in the manner described above, causes an energizing pulse to be introduced to the solenoid winding 426, and such a pulse immediately causes the station to change from its stacking mode to its feeding mode. At the same time, the switch 500 closes to activate a solenoid valve 520 which is disposed in a vacuum pressure feed line 522 extending to the feed head 24. When that solenoid valve is activated, an over-riding vacuum pressure is introduced at the surface of the feed head 24. This vacuum pressure prevents any cards from being transferred from the station 18** until the vacuum pressure becomes interrupted.

In like manner, the closure of the relay switch 500 causes a solenoid valve 524 to be activated. This latter solenoid valve is disposed in a vacuum pressure feed line 526 which extends to the surface of the feed head 36 of the station 20. When the latter solenoid valve is activated, an over-riding vacuum pressure is established at the surface of the feed head 36, if that feed head should be in its active condition.

The control system, as described above, provides therefore that when the magazine 50, for example, reaches a full condition, the station 18 is immediately switched from its stacking mode to its feeding mode, and an over-riding vacuum pressure is provided at the feed head 24 to prevent any cards from being fed out of the station. Likewise, an over-riding vacuum pressure is established at the surface of the feed head 36 of the station 20, so that in the event of the mal-functioning of a portion of the control system, no cards can be fed out of the station 20.

Then, if for any reason, due, for example, to a malfunctioning of the control system, the station 18 fails to be set to its feed condition when its magazine 50 reaches its fully loaded condition, the subsequent introduction of cards into the station causes the forward portion **208*a* of the barrier 208 to break the light beam emerging from the aperture 204. This causes the over-flow relay switch 504 to close. Such closure of the relay switch 504** causes the circuit breaker 510 to open, and immediately stops the rotational movement of the drum 10, in the described manner. As an additional indication, the indicator lamp 506 is energized whenever the magazine 50 reaches a full condition.

The invention provides, therefore, an improved control system for use in a card processing apparatus. The improved control system of the invention provides an indication, and initiates appropriate controls, whenever any one of the stations in the system reaches a "full" condition with respect to cards fed into the station. Moreover, the control system of the invention may incorporate an "overflow" control which serves to halt the operation of the system in the event that an over-flow condition occurs. It will be understood that the suggested controls initiated by the control system of the invention are by way of example only. It may be appropriate in many instances, for example, to cause the "full" relay switches merely to energize appropriate indicators, and to cause control effects to be initiated only upon the closure of the "overflow" relay switch.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In apparatus for processing data on a plurality of information storage elements as represented by signal indications on the elements, the combination of: means for holding information storage elements in the plurality, transfer means positioned relative to the holding means and operative in a first relationship to obtain a sequential and individual transfer of information storage elements in the plurality into the holding means and operative in a second relationship to prevent the sequential transfer of information storage elements in the plurality into the holding means, light-responsive switching means positioned on one side of the holding means, a light source positioned on a second side of the holding means opposite to the first side, means disposed in the holding means and variably positioned in the holding means in accordance with the number of elements in the holding means for establishing an optical path from the light source to the light-responsive switching means and for obtaining an interruption in the optical path after a particular number of information storage elements have been transferred into the holding means by the transfer means, and control means responsive to the interruption in the optical path to the switching means to produce an operation of the transfer means in the second relationship for preventing the subsequent transfer of elements in the plurality from the transfer means to the holding means.

2. In apparatus for processing data on a plurality of information storage elements as represented by signal indications on the elements, the combination of: means for holding information storage elements in the plurality, transfer means positioned relative to the holding means and operative in a first relationship to obtain a sequential and individual transfer of information storage elements in the plurality into the holding means and operative in a second relationship to prevent a sequential transfer of information storage elements in the plurality into the holding means, means included in the holding means for variable positioning in accordance with the transfer of information storage elements in the plurality into the holding means by the transfer means, switching means fixedly positioned relative to the holding means to become operated by the variable positioning means upon the transfer of a particular number of information storage elements into the holding means by the transfer means, and control means responsive to the operation of the switching means to produce an operation of the transfer means in the second relationship for preventing any subsequent transfer of information storage elements in the plurality from the transfer means to the holding means.

3. In apparatus for processing data on a plurality of information storage elements as represented by signal indications on the elements, the combination of: transport means for the information storage elements, means for holding storage elements in the plurality, means disposed relative to the elements in the plurality on the transport means and operative in a first relationship to obtain a controlled transfer of storage elements in the plurality sequentially and individually from the transport means into the holding means and operative in a second relationship for preventing the transfer of storage elements in the plurality from the transport means into the holding means, control means included in the holding means for variable disposition in accordance with the transfer of information storage elements in the plurality into the holding means by the transfer means, energy-responsive means fixedly disposed at a first position relative to the holding means, an energy source fixedly disposed at a second position relative to the holding means to transmit energy to the energy-responsive means, the control means being variably disposed in the holding means to obtain an interruption in the transmission of energy from the source to the energy-responsive means upon the transfer of at least a particular number of elements in the plurality from the transport means to the holding means, and control means responsive to the interruption in the transmission of energy from the source to the energy-responsive means for operating upon the transfer means to obtain an operation of the transfer means in the second relationship for preventing the subsequent transfer of elements in the plurality from the transport means to the holding means.

4. In apparatus for processing data on a plurality of information storage elements as represented by signal indications on the elements, the combination of: means constructed to hold storage elements in the plurality in stacked relationship, transfer means disposed in co-operative relationship with the holding means to obtain a controlled transfer of elements in the plurality sequentially and individually from holding means in a first operative relationship and to obtain a transfer of elements in the plurality sequentially and individually into the holding means in a second operative relationship, first control means coupled to the transfer means for conditioning the transfer means to the first operative relationship in a first operating cycle and to the second operative relationship in a second operating cycle, transport means for the information storage elements and disposed relative to the transfer means to obtain a transfer of elements between the holding means and the transport means, means operatively coupled to the transport means to control the transport of elements by the transport means, first and second photo-electric switching means positioned on one side of the holding means, at least one light source positioned on the opposite side of the holding means from the first and second photo-electric switching means to establish optical paths to the first and second photo-electric switching means, movable means included in the holding means for variable disposition in the holding means in accordance with the transfer of elements between the holding means and the transport means, said movable means having a configuration to interrupt the optical path from the light source to the first photo-electric switching means after a first particular number of information storage elements in the plurality have been transferred into the holding means by the transfer means in the second operative relationship of the transfer means, said movable means further having a configuration to additionally interrupt the optical path from the light source to the second photo-electric switching means after a second particular number of information storage elements in the plurality have been transferred into the holding means by the transfer means in the second operative relationship of the transfer means, a second control means responsive to the interruption in the optical path to the first photo-electric switching means to obtain a change in the transfer means from the second operative relationship to the first operative relationship, and third control means responsive to the interruption in the optical path to the second photo-electric switching means for operating upon the transport control means to prevent a further transport of the elements.

5. In apparatus for processing data on a plurality of information storage elements as represented by signal indications on the elements, the combination of: means constructed to hold information storage elements in the plurality in stacked relationship, transport means for the elements, follower means movable within the holding means for maintaining the storage elements in the holding means in a stacked relationship, a feed head actuatable to an operative condition in co-operative relationship with the elements in the holding means to obtain a controlled transfer of storage elements sequentially and individually from the holding means to the transport means and actuatable to a standby condition, a stack head actuatable to an operative condition in co-operative relationship with the elements on the transport means to obtain a controlled transfer of storage elements sequentially and individually from the transport means into the holding means and actuatable to a standby condition, energy-responsive means mounted on a first side of the holding means, an energy source mounted on a second side of said holding means opposite to the first side to direct energy through the holding means to the energy-responsive means, barrier means mounted on said follower means for movement with the card follower means to obtain an interruption in the passage of energy from the source to the energy-responsive means after a particular number of storage elements have been transferred into the holding means by the stack head in the operative condition of the stack head, and control means responsive to the interruption in the passage of energy from the source to the energy-responsive means to produce an actuation of the feed head to the operative position.

6. In apparatus for processing data on a plurality of information storage elements as represented by signal indications on the elements, the combination of: means constructed to hold information storage elements in the plurality in stacked relationship, follower means movable within the holding means for maintaining the storage elements in the holding means in a stacked relationship, transport means for the elements, a feed head actuatable to an operative condition in co-operative relationship with the elements in the holding means to obtain a controlled transfer of storage elements sequentially and individually from the holding means to the transport means and actuatable to a standby condition out of co-operative relationship with the elements in the holding means, a stack head actuatable to an operative condition in co-operative relationship with the elements on the transport means to obtain a controlled transfer of storage elements sequentially and individually from the transport means into the holding means and actuatable to a standby condition out of co-operative relationship with the elements in the holding means, photo-electric means mounted on one side of the holding means, a light source mounted on the other side of the holding means to direct a light beam through the holding means to the photo-electric switching means, barrier means mounted on said follower means for interrupting the light beam from the light source to the photo-electric means after a particular number of storage elements in the plurality have been transferred from the transport means into the holding means by the stack head in the operative condition of the stack head and the standby condition of the feed head, and control means responsive to the interruption in the passage of the light from the source to the photo-electric switching means to actuate the feed head to the operative condition and the stack head to the standby condition.

7. In apparatus for processing data on a plurality of information storage elements as represented by signal indications on the elements, the combination of: means constructed to hold information storage elements in the plurality in stacked relationship and having a mouth to obtain a transfer of elements into and out of the holding means, transport means for the elements, follower means movable within the holding means in accordance with the number of elements in the holding means and disposed relative to the elements in the holding means to maintain the storage elements sequentially and individually in the holding means in a stacked condition, a feed head actuatable to an operative condition in co-operative relationship with the elements in the holding means to obtain a controlled transfer of storage elements sequentially and individually from the holding means to the transport means and actuatable to a standby position out of co-operative relationship with the elements in the holding means, a stack head actuatable to an operative condition in co-operative relationship with the elements on the transport means to obtain controlled transfer of storage elements sequentially and individually into the holding means from the transport means and actuatable to a standby condition out of co-operative relationship with the elements sequentially and individually on the transport means, switching means mounted adjacent said holding means at a position removed from the mouth of the holding means for actuation by the follower means upon the transfer of a particular number of elements in the plurality into the holding means from the transport means in the operative condition of the stack head and the standby condition of the feed head, and control means responsive to the actuation of the switching means to actuate the feed head to the operative condition and the stack head to the standby condition.

8. In apparatus for processing data on a plurality of information storage elements as represented by signal indications on the elements, the combination of: transport means for the elements, a plurality of means each constructed to hold information storage elements in the plurality in stacked relationship, a plurality of feed heads each included in a different one of the holding means in the plurality and actuatable to an operative condition in co-operative relationship with the elements in the associated holding means to control the transfer of storage elements from the holding means to the transport means and each actuatable to a standby condition out of co-operative relationship with the elements in the associated holding means, a plurality of means each coupled to a different one of the feed heads in the plurality for providing a controlled introduction of vacuum pressure to the coupled feed head to control the transfer of elements from the associated holding means, a plurality of stack heads each included in a different one of the holding means in the plurality and actuatable to an operative condition in co-operative relationship with the elements on the transport means to control the transfer of storage elements from the transport means into the associated holding means and each actuatable to a standby condition out of co-operative relationship with the elements on the transport means, energy-responsive means mounted adjacent at least a particular one of the holding means in the plurality at one side of the holding means, an energy source mounted adjacent such particular one of the holding means in the plurality at the other side of the holding means to direct energy through such holding means to the energy-responsive means, means movable in said particular one of said holding means in the plurality upon the introduction of a particular number of storage elements in the holding means by the associated stack head in the plurality from other holding means in the plurality to interrupt the passage of energy from the source to the energy-responsive means, and control means responsive to the interruption in the passage of energy from the source to the energy-responsive means to actuate to the standby condition the stack head included in the particular holding means and to actuate to the operative condition the feed head included in the particular holding means and to obtain the introduction of a vacuum pressure to the particular feed head and to the other feed heads in the plurality.

9. In apparatus for processing data on a plurality of information storage elements as represented by signal indications on said elements, the combination of: means constructed to hold information storage elements in the plurality in stacked relationship, transport means for the elements in the plurality, follower means movable within the holding means in accordance with the number of elements in the holding means for maintaining the storage elements in the holding means in a stacked condition, a feed head actuatable to an operative condition in co-operative relationship with the elements in the holding means to obtain a controlled transfer of storage elements sequentially and individually from the holding means to the transport means and actuatable to a standby condition out of coupled relationship with the elements in the holding means, a stack head actuatable to an operative condition in coupled relationship with the elements on the transport means to obtain a controlled transfer of storage elements sequentially and individually into the holding means from the transport means and actuatable to a standby condition out of coupled relationship with the elements on the transport means, first and second energy-responsive means mounted on a first side of the holding means, an energy source mounted on a second side of the holding means opposite to the first side to direct energy through the holding means to the first and second energy-responsive means, the follower means being constructed to interrupt the passage of energy to the first energy-responsive means after a first particular number of storage elements have been transferred into the holding means from the transport means in the operative condition of the stack head and to interrupt the passage of energy to the second energy-responsive means after a second particular number of storage elements in the plurality have been transferred into the holding means from the transport means where the second particular number is greater than the first particular number, means coupled to the transport means to control the transport of elements, first control means responsive to the interruption in the passage of energy to the first energy-responsive means for obtaining an operation of the feed head in the operative condition, and second control means coupled to the transport-control means and responsive to the interruption in the passage of energy to the second energy-responsive means for operating upon the transport-control means to prevent any further transport of the elements in the plurality.

10. In apparatus for processing data on a plurality of information storage elements as represented by signal indications on the elements, the combination of: means for holding information storage elements in the plurality in a stacked relationship, transport means for the elements, transfer means positioned adjacent the holding means and disposed relative to the cards on the transport means for obtaining a sequential and individual transfer of information storage elements in the plurality into the holding means from the transport means, movable means included in the holding means for variable disposition in the holding means in accordance with the transfer of elements into the holding means by the transfer means, first and second energy-responsive means positioned adjacent the holding means, an energy source disposed relative to the holding means to obtain a passage of energy to the first and second energy-responsive means, the movable means being constructed to interrupt the passage of energy to the first and second energy-responsive means upon the respective transfer of first and second particular numbers of cards from the transport means into the holding means where the second particular number is greater than the first particular number, indicator means, first control means coupled to the first energy-responsive means and to the indicator means for actuating the indicator means upon the interruption in the passage of energy to the first energy-responsive means, and second control means coupled to the second energy-responsive means to prevent any transfer of elements into the holding means upon the interruption in the transfer of energy to the second energy-responsive means.

11. In apparatus for processing data on a plurality of information storage elements as represented by signal indications on the elements, the combination of: means constructed to hold information storage elements in the plurality in stacked relationship, spring-biased follower means movable in the holding means and disposed against the elements in the holding means to maintain such elements in stacked relationship, transport means for the elements, a feed head movable to an operative position in co-operative relationship with the elements in the holding means to obtain a controlled transfer of elements sequentially and individually from the holding means to the transport means and movable to a standby position out of co-operative relationship with the elements in the holding means, first and second switching means mounted adjacent the holding means, a stack head movable to an operative position in co-operative relationship with the elements on the transport means to control the transfer of elements from the transport means to the holding means and movable to a standby position out of co-operative relationship with the elements on the transport means, the follower means being constructed to sequentially actuate the first and second switching means after a first particular number and a second particular number of cards have been respectively transferred into the holding means by the stack head in the operative position of the stack head and the standby position of the feed head, first control means responsive to the actuation of the first switching means for actuating the feed head to the operative position and the stack head to the standby position, means coupled to the transport means to control the transport of elements by the transport means, and second control means responsive to the actuation of the second switching means to operate upon the transport-control means for preventing any further transport of elements in the plurality.

12. The combination defined in claim 11 in which said card follower means is mounted in a removable magazine which receives the elements from the stack head, and in which the magazine is provided with first and second apertures and in which the first and second switching means respectively include first and second energy-responsive means disposed adjacent the first and second apertures and in which an energy source is disposed relative to the apertures to direct energy through the apertures to the first and second energy-responsive means and in which the follower means is disposed in the holding means between the energy source and the first and second energy-responsive means to interrupt the passage of energy from the source to the first and second energy-responsive means upon the respective transfer of the first and second particular number of elements in the plurality into the holding means.

References Cited in the file of this patent

UNITED STATES PATENTS

| | | |
|---|---|---|
| 1,826,992 | Carroll | Oct. 13, 1931 |
| 2,171,362 | Gulliksen | Aug. 29, 1939 |
| 2,484,111 | Mills | Oct. 11, 1949 |